(12) United States Patent
Young et al.

(10) Patent No.: US 8,327,677 B2
(45) Date of Patent: Dec. 11, 2012

(54) METHOD AND DEVICE FOR BENDING ELECTRIC MACHINE CONDUCTORS

(75) Inventors: Kevin Allen Young, Fairmount, IN (US); Mark A. Stephenson, Fairland, IN (US)

(73) Assignee: Remy Technologies, LLC, Pendleton, IN (US)

( * ) Notice: Subject to any disclaimer, the term of this patent is extended or adjusted under 35 U.S.C. 154(b) by 788 days.

(21) Appl. No.: 12/419,823

(22) Filed: Apr. 7, 2009

(65) Prior Publication Data
US 2009/0249853 A1 Oct. 8, 2009

Related U.S. Application Data

(60) Provisional application No. 61/123,227, filed on Apr. 7, 2008.

(51) Int. Cl.
*B21B 15/00* (2006.01)
(52) U.S. Cl. ............................. 72/112; 140/92.1; 140/147
(58) Field of Classification Search ................. 140/92.1, 140/123, 147; 72/112, 379.2; 29/596, 605
See application file for complete search history.

(56) References Cited

U.S. PATENT DOCUMENTS

| | | | | |
|---|---|---|---|---|
| 4,393,904 A | * | 7/1983 | Muskulus | 140/92.1 |
| 4,665,952 A | * | 5/1987 | Macemon et al. | 140/92.2 |
| 4,870,742 A | * | 10/1989 | Roloff | 29/33 S |
| 5,479,810 A | * | 1/1996 | Hartmann et al. | 72/302 |
| 5,640,752 A | * | 6/1997 | Steiner | 29/596 |
| 6,519,993 B2 | * | 2/2003 | Even | 72/112 |
| 6,557,239 B2 | | 5/2003 | Takahashi et al. | |
| 7,805,825 B2 | * | 10/2010 | Guercioni | 29/596 |
| 2001/0013167 A1 | * | 8/2001 | Maeda et al. | 29/596 |
| 2002/0046779 A1 | * | 4/2002 | Even | 140/92.1 |
| 2002/0053126 A1 | * | 5/2002 | Maeda et al. | 29/596 |
| 2003/0005579 A1 | * | 1/2003 | Takahashi et al. | 29/732 |
| 2003/0024101 A1 | * | 2/2003 | Tokizawa et al. | 29/596 |
| 2004/0172805 A1 | * | 9/2004 | Tokizawa | 29/596 |
| 2008/0315705 A1 | * | 12/2008 | Obata et al. | 310/198 |

FOREIGN PATENT DOCUMENTS
EP 1376816 A2 1/2004
* cited by examiner

*Primary Examiner* — Dana Ross
*Assistant Examiner* — Lawrence J Averick
(74) *Attorney, Agent, or Firm* — Maginot, Moore & Beck

(57) ABSTRACT

A twisting device comprises at least one conductor coupler configured to engage a plurality of the conductors and at least one drive operably connected to the conductor coupler. The at least one drive is configured to rotate the conductor coupler in order to bend the plurality of the conductors and simultaneously move the conductor coupler in an axial direction relative to the electric machine component. An associated method of bending conductors positioned in a component of an electric machine comprises first engaging a plurality conductors with a conductor coupler. Thereafter, the plurality of conductors are bent by rotating the conductor coupler while simultaneously moving the conductor coupler in an axial direction relative to the component of the electric machine.

7 Claims, 7 Drawing Sheets

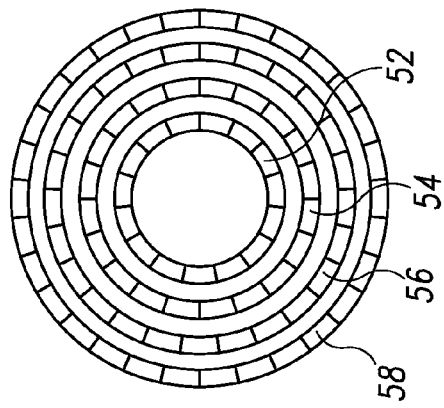
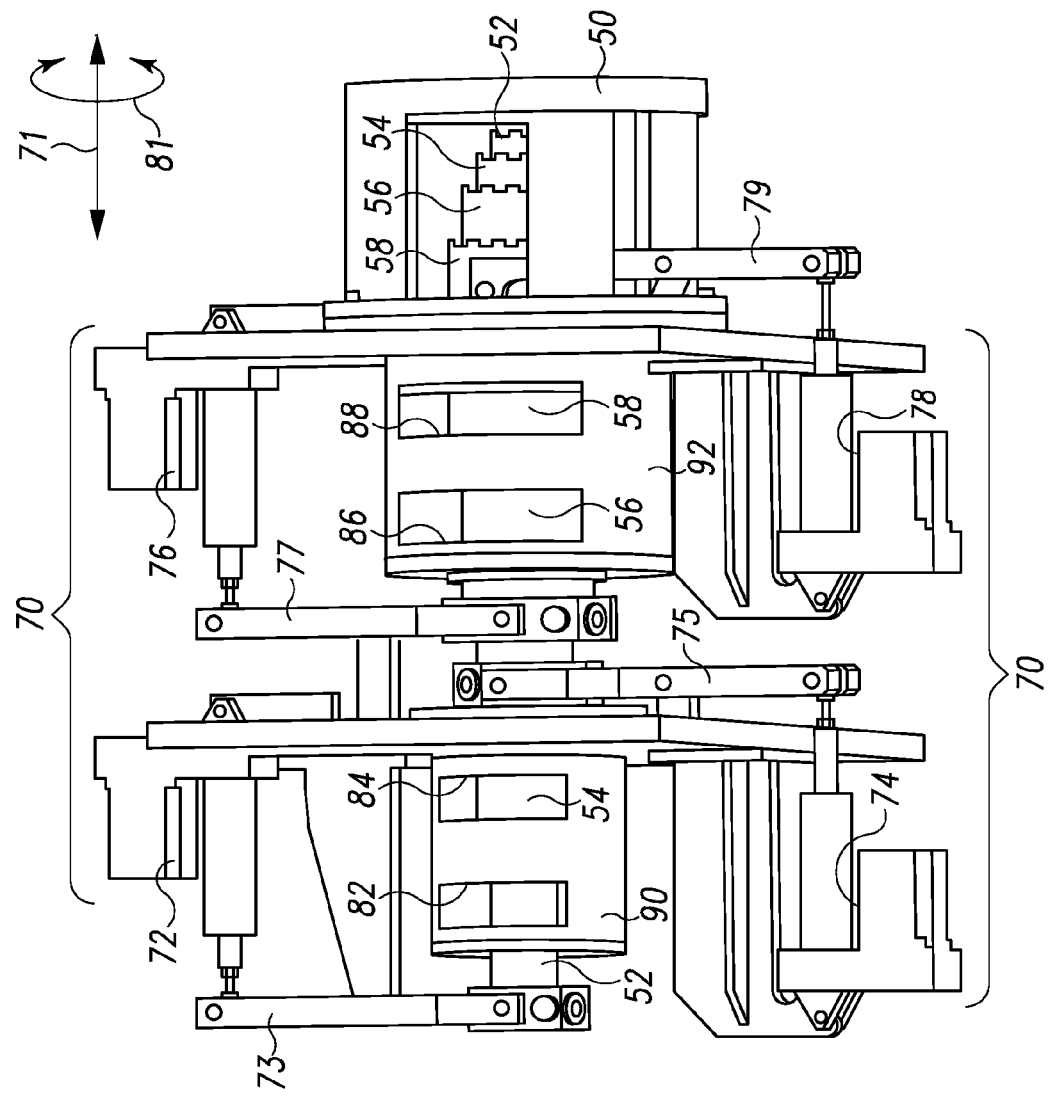

METHOD AND DEVICE FOR BENDING ELECTRIC MACHINE CONDUCTORS

CROSS-REFERENCE TO RELATED APPLICATIONS

This application claims the benefit of U.S. provisional patent application No. 61/123,227, filed Apr. 7, 2008, the contents of which are incorporated herein by reference.

BACKGROUND

This application relates to the field of electric machines, and more particularly, electric machines having bent conductor windings.

Electric machines are important components of conventional internal combustion engine automobiles. For example, electric machines typically serve as starting motors to crank automobile engines. Other electric machines serve as alternators that generate electricity from engine motion and deliver power to automobile loads. Electric machines are also very important in modern hybrid electric vehicles (HEVs), serving as a core component in the HEV's electric drive system.

The electric machine in many HEVs comprises a laminated stator stack with a plurality of rectangular windings inserted into the stator slots. In order to insert the windings into the stator slots, U-shaped segmented conductors (also referred to herein as "hairpins" or "U-shaped bars") of rectangular cross-section are utilized. These hairpins are created by cutting a rectangular conductor into many segments with each segment having a certain length. The straight segments of wire are then bent and twisted into U-shaped conductors (or "hairpin" conductors) with the proper span for the electric machine. Next, the U-shaped conductors are inserted into the slots of the stator core from an insertion end of the stator. After the U-shaped conductors are inserted into the slots, the legs of the hairpin conductors extend from a connection end of the stator in multiple radial rows of conductors. These leg ends are then bent to appropriate positions before connections are made between the conductors. FIG. 7 shows a plurality of bent conductors 12 provided in an outer row of conductors for an exemplary stator core 14. An exemplary four layer conductor arrangement is disclosed in U.S. Pat. No. 7,034,428 to Cai et al., the contents of which are incorporated herein by reference.

Precise bending (also referred to herein as "twisting") of the leg ends of the U-shaped conductors facilitates proper connections between the conductors. However, it can be difficult to bend the conductor ends the exact amount required for a proper connection. In particular, there is relatively little space between the conductors at the end of the stator, and this alone makes access to the conductors and any associated movement required for bending of the conductors difficult. Furthermore, the metal conductors are resilient and tend to spring back to some extent toward their original position after they are bent. This makes precise bending to a desired degree or to a desired location difficult. Furthermore, when a conductor is bent, the height profile of the conductor is changed. In particular, the greater the degree of bending required, the lower the final height profile of the bent conductor. With current bending machines, the rotation and height positioning are not independent. An inability to adapt to the changing height of the conductor during bending may result in an improper bend.

In view of the foregoing, it would be advantageous to provide a method and device for twisting stator windings in a more precise fashion. It would also be advantageous if such twisting could be done quickly and with relative ease. It would also be advantageous if such twisting could be accomplished while adapting the system to accommodate for both the rotational offset and the height change in the conductors during the twisting process.

SUMMARY

In at least one embodiment, a method of bending conductors positioned in a component of an electric machine comprises first engaging a plurality conductors with a conductor coupler. Thereafter, the plurality of conductors are bent by rotating the conductor coupler while simultaneously moving the conductor coupler in an axial direction relative to the component of the electric machine.

In at least one embodiment, the step of bending the conductor coupler comprises rotating the conductor coupler in a first rotational direction while simultaneously moving the conductor coupler in an axial direction toward the component of the electric machine and then rotating the conductor coupler in a second rotational direction opposite the first rotational direction in order to bend the plurality of the conductors to a desired position.

The conductor coupler may be a first conductor coupler with a second conductor coupler coaxial with the first conductor coupler. The second conductor coupler engages a second plurality of the conductors which are bent by rotating the second conductor coupler opposite the direction of rotation of the first conductor coupler. Simultaneous with the rotation of the second conductor coupler, the second conductor coupler is moved in the axial direction relative to the component of the electric machine. Servomotors may be used to drive the first and second conductor couplers in both the rotational direction as well as the axial direction.

In at least one embodiment four layers of conductors are positioned in the electric machine component. A separate and independent conductor coupler is brought into contact with each of the four layers of conductors. The conductor couplers are used to precisely twist/bend of the conductors. Servos are used to drive and control the position of each of the conductor couplers. The rotation and height of each conductor layer of the stator is controlled independently using the servo control. Accordingly, the machine uses eight axes to position four layers of conductors: four axis are used for rotational positioning and four axis for height positioning.

The above described features and advantages, as well as others, will become more readily apparent to those of ordinary skill in the art by reference to the following detailed description and accompanying drawings. While it would be desirable to provide a method and device that provides one or more of these or other advantageous features as may be apparent to those reviewing this disclosure, the teachings disclosed herein extend to those embodiments which fall within the scope of any appended claims, regardless of whether such embodiments accomplish one or more of the above-mentioned advantages.

BRIEF DESCRIPTION OF THE DRAWINGS

FIG. 6A shows a top cutaway view of the conductor twisting device of FIG. 5;

FIG. 6B shows a front view of the barrels of the conductor twisting device of FIG. 6A along the axis of the barrels.

DESCRIPTION

Figure 1:
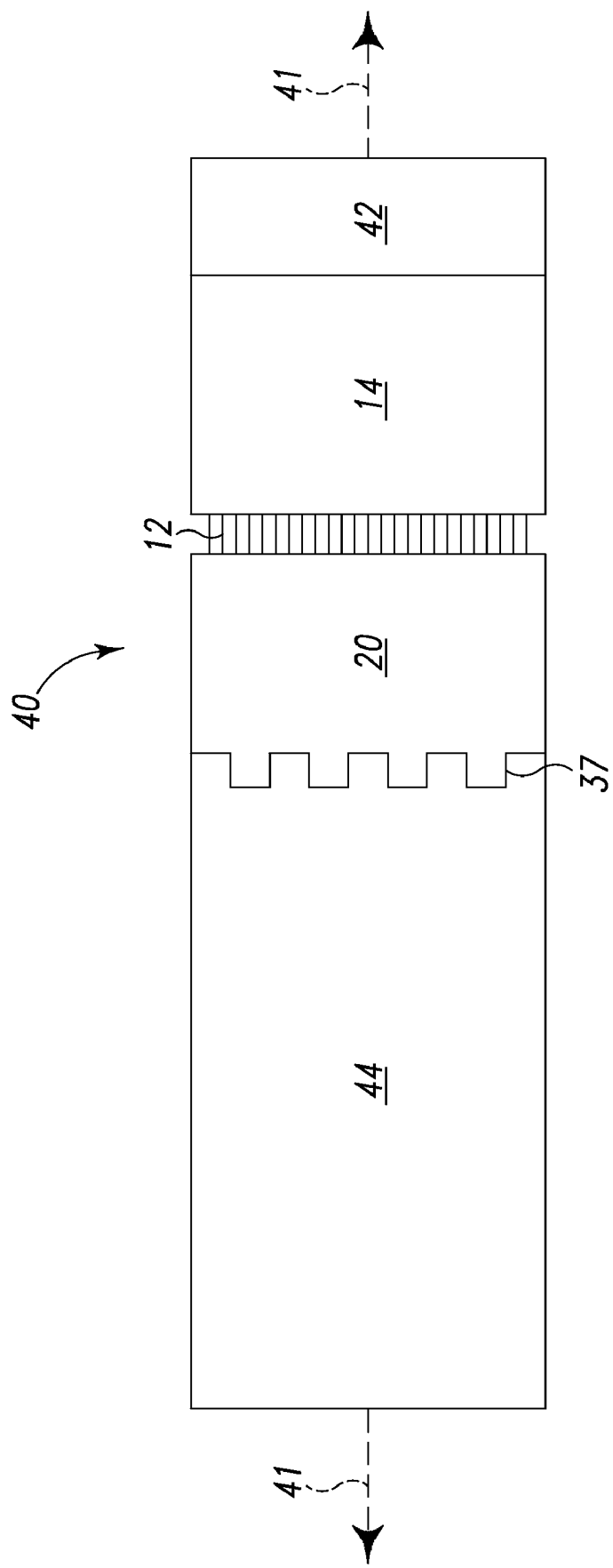
FIG. 1 shows a diagrammatic view of a conductor twisting device including a twisting portion and a connection arrangement.

With reference to FIG. 1, a diagrammatic view of a conductor twisting device 40 is shown engaging a stator 14 and stator conductors 12. The twisting device 40 includes a twisting portion 44 configured to rotate about axis 41. The twisting device 44 releasably engages a connection arrangement 20 along a toothed interlock 37. The connection arrangement 20 engages the conductors 12 which extend from the stator core 14. The stator core 14 is held in a stationary position by the twisting device 40 using the stator clamp 42. Rotation of the twisting device 44 about the axis 41 results in rotation of the connection arrangement 20 and the engaged conductors 12.

Figure 2:
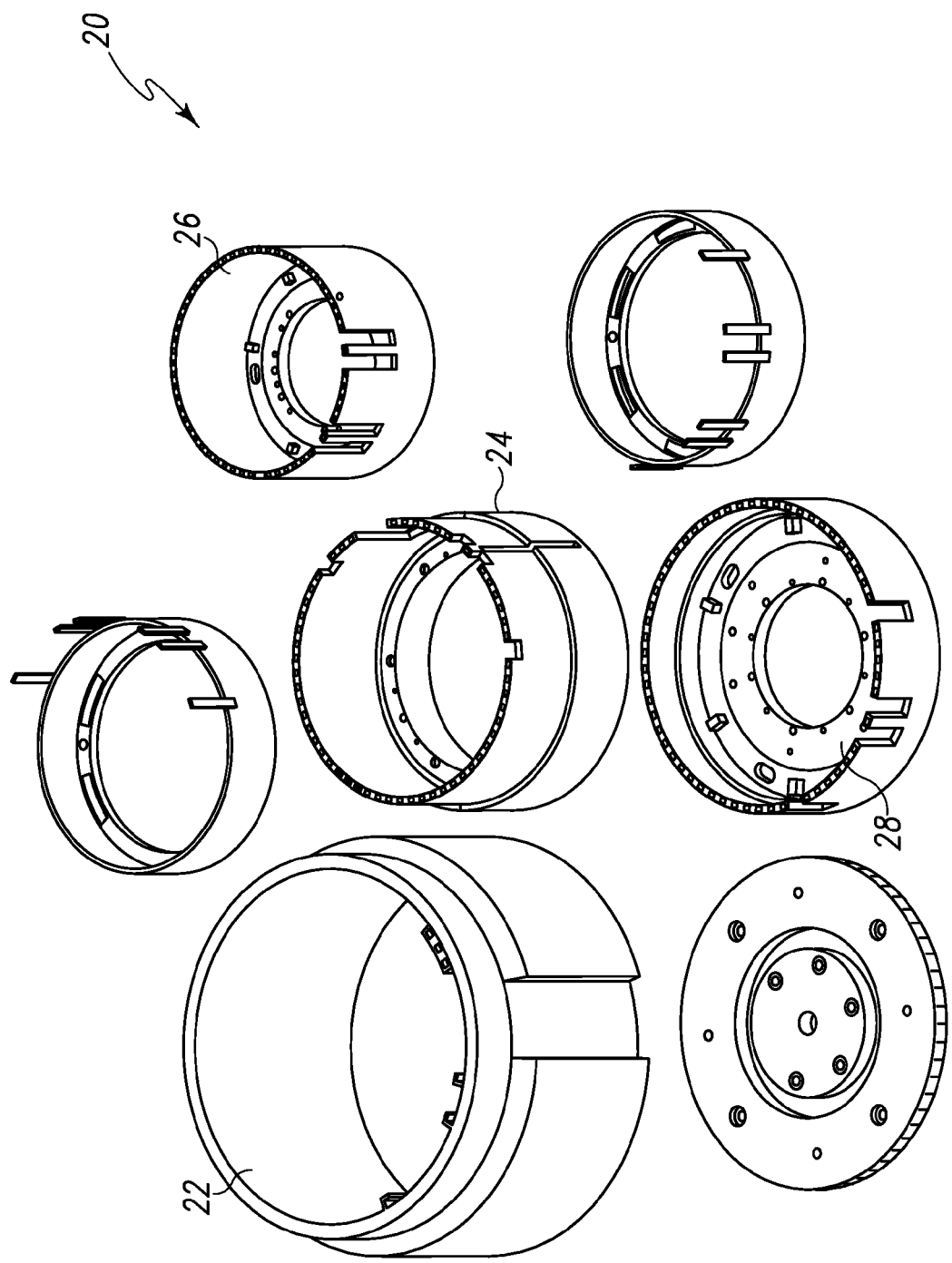
FIG. 2 shows a perspective view of a plurality of connection cylinders of the connection arrangement of FIG. 1.

With reference to FIG. 2, an exemplary unassembled connection arrangement 20 is shown for use with the electric machine twisting device disclosed herein. The connection arrangement 20 comprises a plurality of separate conductor couplers in the form of cylinders 22, 24, 26 and 28. Each of the cylinders 22, 24, 26, 28 are assembled in a concentric fashion to form the connection arrangement 20. Each of the cylinders includes an elongated central body provided between a slotted rim 30 on one end and a toothed rim 34 (see FIG. 3B) on the opposite end.

Figure 3A:
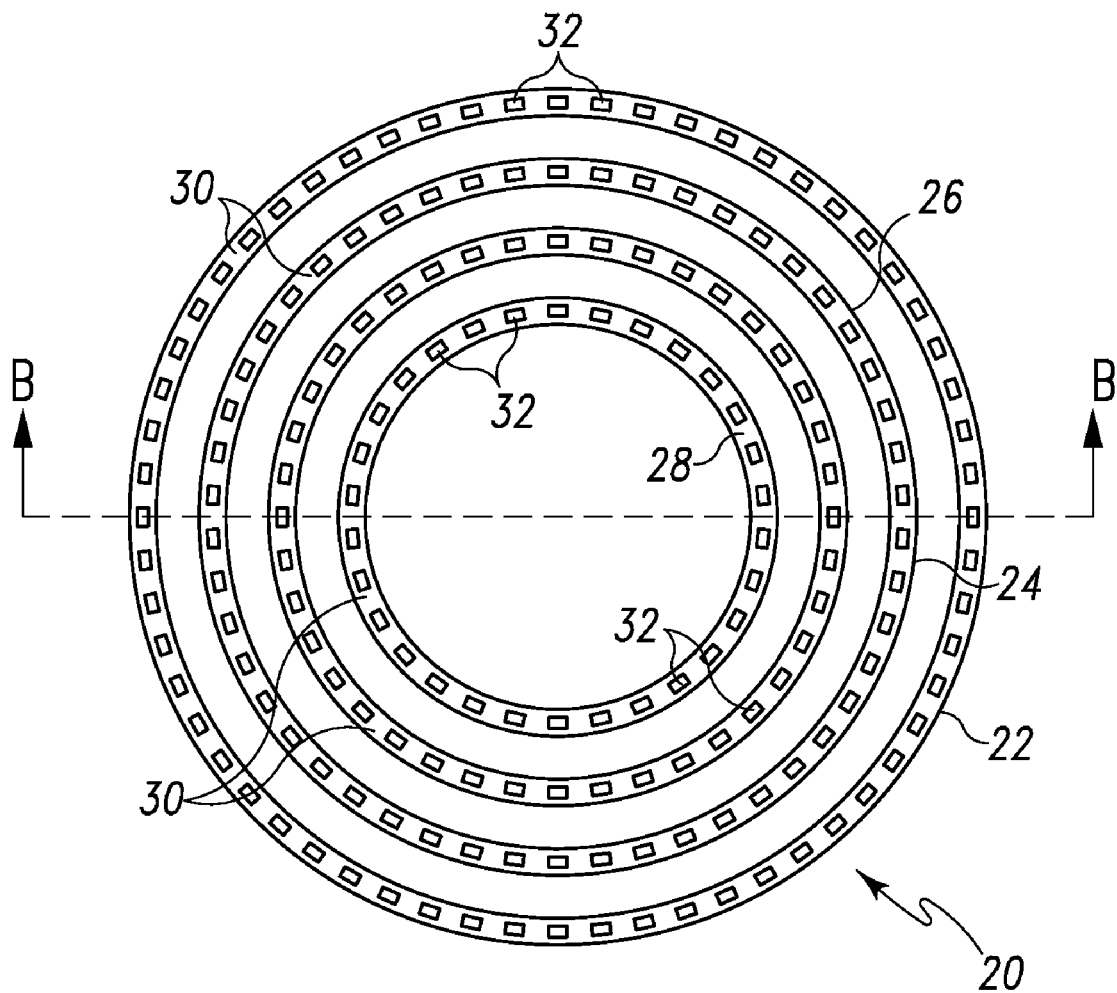
FIG. 3A shows the connection cylinders of FIG. 2 assembled to form the connection arrangement.

FIG. 3A shows and end view of the slotted rims 30 of each of the cylinders 22, 24, 26, 28 when assembled concentrically to form the connection arrangement 20. Each slotted rim 30 includes a plurality of slots 32 provided as holes or cavities in the rim 30. The slots 32 are designed and dimensioned to receive the ends of the conductors 12 provided in the stator core 14. Thus, the leg ends of the conductors fit down into the slots 32 provided on the rim 30 in a direction parallel to the center axis of the cylinders. The slots 32 are generally configured to match the cross-sectional shape of the conductors. However, the slots 32 are slightly larger than the conductor ends, thus allowing the conductors to be easily inserted into the slots.

Figure 3B:
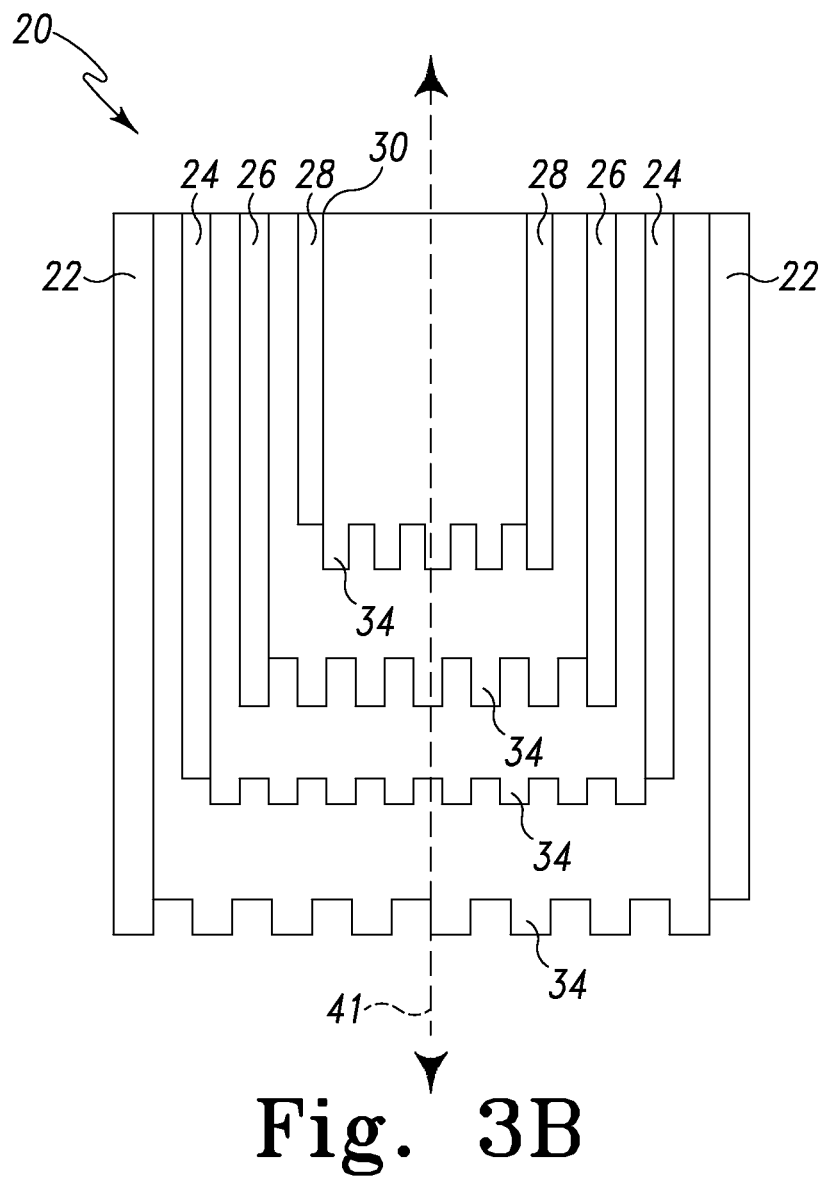
FIG. 3B shows a cross-sectional view of the assembled connection arrangement along line B-B of FIG. 3A.

FIG. 3B shows a cross-sectional view of the assembled cylinders 22, 24, 26, 28 which form the connection arrangement 20. As shown in FIG. 3B, the cylinders 22, 24, 26, 28 are nested in concentric fashion about axis 41 to form the connection arrangement 20. Each cylinder 22, 24, 26, 28 includes a toothed rim 34 opposite the slotted rim 30. The slotted rims 30 of each cylinder 22, 24, 26, 28 are generally closer together than the toothed rims 34. However, it will be recognized that each of the cylinders 22, 24, 26 and 28 are independent of the other cylinders of the connection arrangement 20. Accordingly, each of the cylinders 22, 24, 26 and 28 is capable of independent rotation about axis 41 and independent linear movement along axis 41 without resulting in movement of the other cylinders of the connection arrangement 20.

Figure 4:
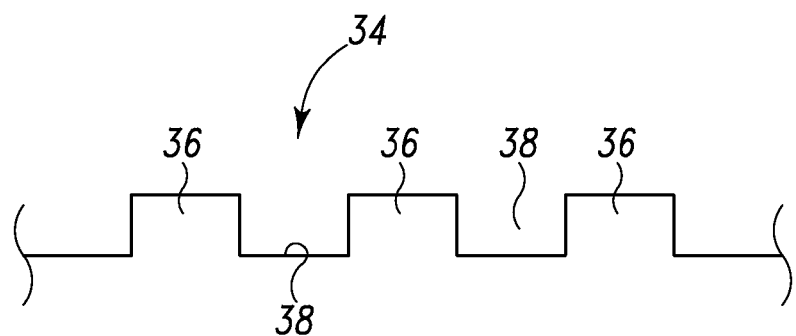
FIG. 4 shows a side view of a portion of a toothed rim of one of the connection cylinders of FIG. 2 opposite the slotted rim of the connection cylinder.

FIG. 4 shows a side view of a portion of the toothed rim of one of the cylinders 22, 24, 26 or 28. The toothed rim 34 is provided on the opposite end of the cylinder from the slotted rim 30. The toothed rim 34 includes a plurality of teeth 36 that encircle the end of the cylinder. Depressions 38 are provided between each of the teeth 36.

Figure 5:
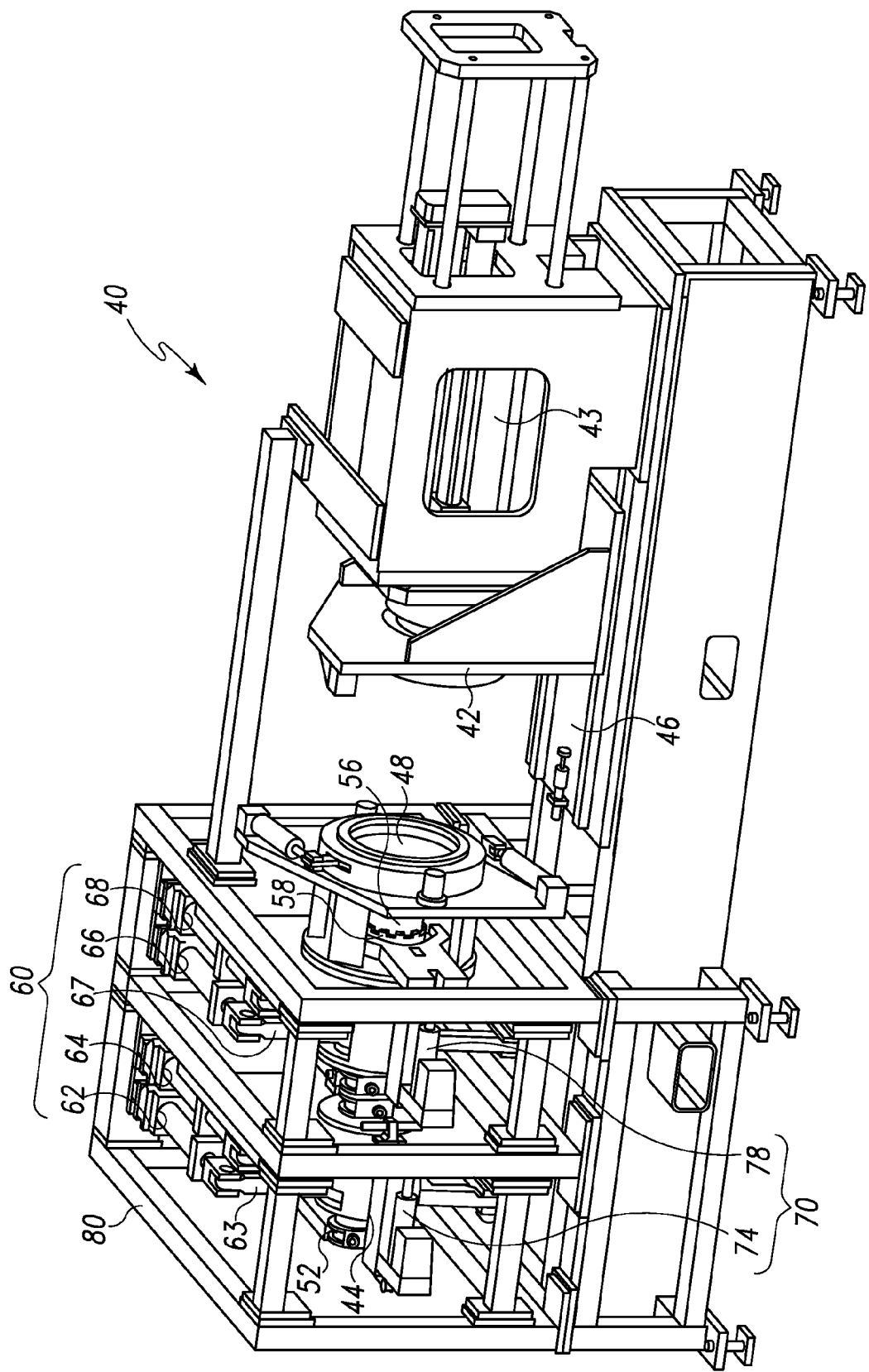
FIG. 5 shows a perspective view of the conductor twisting device of FIG. 1 without the conductor coupler.
Figure 7:
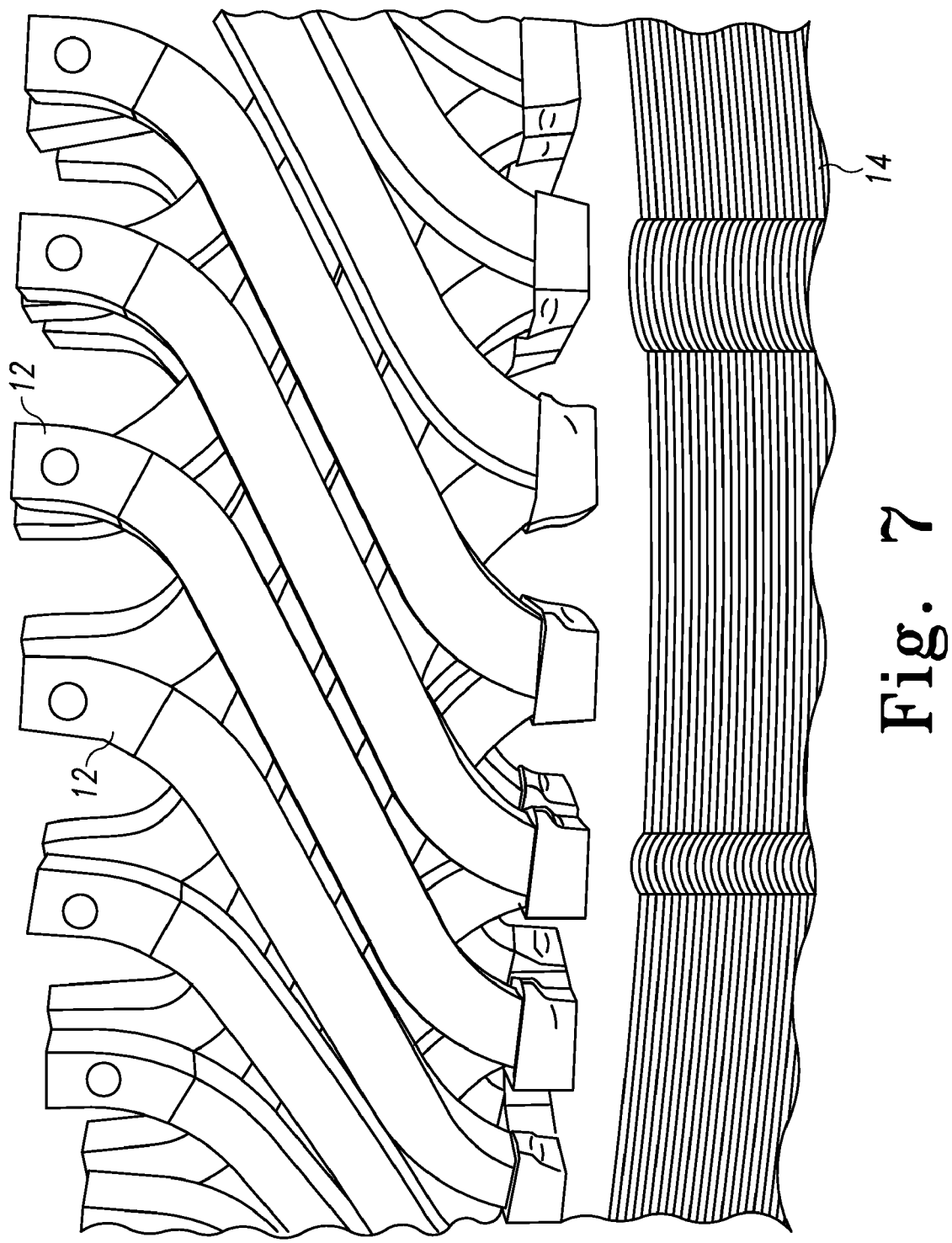
FIG. 7 shows a close-up view of a group of bent conductors extending from the connection end of a stator.

With reference now to FIG. 5, a perspective view of a conductor twisting device 40 is shown without the connection arrangement 20 positioned in the device 40. The conductor twisting device 40 comprises a stator clamp portion 42 and a conductor twisting portion 44, with a tooling area 48 provided in between. A stator (not shown in FIG. 5) is positioned in a staging area 46 of the clamp portion 42 with the conductor ends of the stator extending toward the twisting portion 44. The clamp portion 42 is configured to hold the stator core 14 stationary while the conductors 12 in the stator are twisted. Thus, the staging area 46 and clamp portion 42 provide a seat for the stator core 14 when the conductors 12 of the stator are bent using the conductor twisting device 40. A stator drive arrangement 43 is operable to move the clamp 42 and stator in a linear direction toward or away from the tooling area 48 of the twisting device 40.

While not show in FIG. 5, it will be recognized that the connection arrangement 20 is configured for insertion in the tooling area 48 of the twisting device 40 with the toothed rims 34 of the connection arrangement (see FIG. 4) facing the twisting portion 44 and the slotted rims 30 of the connection arrangement facing the clamp portion 42. The conductor ends extending from the stator are then inserted into the slots 32 on the connection arrangement 30, with each layer of conductors inserted into a different one of the coaxial cylinders 22, 24, 26, 28 (see FIG. 3). Thus, rotation of one of the cylinders 22, 24, 26, 28 results in twisting of the conductors in the associated layer.

At the opposite end of the connection arrangement from the stator, the toothed rims 34 releasably engage the twisting portion 44 of the twisting device 40. With reference to FIGS. 5, 6A and 6B, the twisting portion 44 comprises a yoke 50 and a plurality of concentric barrels 52, 54, 56, 58 (best seen in FIGS. 6A and 6B). Each of the concentric barrels 52, 54, 56 or 58 is independently rotatable with respect to the other barrels (i.e., in a rotational or "circumferential" direction, as noted by arrow 81). Furthermore, each of the concentric barrels 52, 54, 56 or 58 is moveable in the axial direction toward or away from the clamping portion 42 (i.e., a "linear" direction as noted by arrow 71). Toothed portions on the ends of the concentric barrels are configured to engage the toothed rims 34 on the connection arrangement, forming a toothed interlock 37 between the concentric barrels 52, 54, 56, 58 and the concentric cylinders 22, 24, 26, 28. This toothed interlock secures the cylinders 22, 24, 26, 28 to the barrels 52, 54, 56, 58 when the barrels are rotated or moved in a rotational direction or a linear direction toward the staging area 46. However, the cylinders 22, 24, 26, 28 may be released from the barrels 52, 54, 56, 58 when the barrels are moved in a linear direction away from the staging area 46.

The concentric barrels 52, 54, 56, 58 are operably mounted within a frame 80. In addition, a total of eight servo motors are mounted to the frame 80. The eight servo motors include four servo motors 62, 64, 66 and 68 of a first set 60 and four servo motors 72, 74, 76 and 78 of a second set 70. The servo motors of the first set 60 are configured to provide rotational adjustment to the barrels 52, 54, 56 and 58. The servo motors of the second set 70 are configured to provide linear adjustment to the barrels 52, 54, 56 and 58.

As best seen in FIG. 6A, the second set 70 of servo motors are connected to arms 73, 75, 77 and 79 that extend from the servo to the barrel. When the second set 70 of servo motors operate, the arms 73, 75, 77, 79 move and result in the barrels 52, 54, 56 and 58 also moving in a lateral direction (i.e., a linear direction indicated by arrow 71 in FIG. 6). Accordingly, the second set 70 of servo motors are operable to control linear movement of the barrels 52, 54, 56, 58.

The first set of servos 60 are also connected to the barrels 52, 54, 56, 58 with arms. These arms reach the barrels through openings 82, 84, 86, 88 in the barrel mounting cylinders 90, 92 connected to the frame 80. The arms that extend through the openings 82, 84, 86, 88 are best seen in FIG. 5, but only two of the arms 63 and 67 are shown in FIG. 5. Arm 63 extends through opening 82 and arm 67 extends through opening 86. When the first set 60 of servo motors operate, the arms 63 and 67 move, resulting in rotation of the barrels 52, 54, 56, 58 which are pivotably connected to the arms. Accordingly, the first set 60 of servo motors are operable to control rotational movement of the barrels.

In operation, the stator core 14 is mounted in a stationary position on the twisting device 40 with the conductors of the stator inserted in the slots of the connection arrangement 20. When the barrels 52, 54, 56, 58 are rotated about their axes in the circumferential direction 81 by the first set of servo motors 60, the conductors are twisted. In at least one embodiment, the conductors are twisted in opposite directions in alternating layers. Thus, barrels 52 and 54 are rotated one direction by the servo motors, while barrels 54 and 56 are rotated in opposite directions.

When any barrel 52, 54, 56, 58 is rotated it is also moved in the liner direction 71 toward the stator core 14 by the motors in the second set 70 of servo motors. This also results in linear movement of the associated cylinders 22, 24, 26, 28. This linear movement is made to account for the reduction in height of the conductor ends as they are twisted in the stator. By moving the barrels 52, 54, 56, 58 (and the associated cylinders 22, 24, 26, 28), the device 40 ensures that the conductor ends remain fully seated in the slots 32 of the cylinders 22, 24, 26, 28 during the twisting process. In other words, as the conductors 12 are rotated by the cylinders 22, 24, 26, 28, the conductors tend to pull away from the cylinders. However, because the cylinders 22, 24, 26 and 28 also move in the linear direction toward the stator core 14 when the cylinders are rotated, the conductors 12 are not allowed to escape the slots 32 in the cylinders. Thus, the dual action of rotation and linear movement of the barrels 52, 54, 56, 58 and the associated cylinders 22, 24, 26 and 28 helps ensure that the conductors 12 are properly twisted by the twisting device 40.

By using servo motors to perform the twisting motion, the twisting device 40 may be used to more precisely twist the conductors. In particular, the servo motors may be operated to provide an amount of over-twist to the conductors (i.e., rotation past the desired amount). After an over-twist, the servo motors are used to provide a slight amount of reverse twist to the conductors. The reverse twist returns the conductors back to their desired twisted location for connection. This process of over-twist and return (or reverse twist) reduces the tendency of the conductors to spring back toward their original position and out of the proper connection position.

In addition to the foregoing, it will be recognized the servomotors may be utilized to provide feedback information related to the position of the barrels 53, 54, 56, 58 and associated cylinders 22, 24, 26, 28 during the twisting process. In particular, the servomotors are provided with a rotary encoder on a back portion of each servomotor. The positions of the linear actuators that move the barrels 52, 54, 56 58 of the twisting device 40 are synchronized with the encoders by using home position switches. This information related to the position of an associated barrel may then be used to determine the extent to which the servomotors should be driven to achieve a desired amount of barrel movement. In particular, the servomotors may be connected to a microprocessor which uses the feedback information to drive each servomotor a precise amount in order to achieve a precise amount of rotational or linear movement of the associated barrel. It will also be recognized that the feedback information may also be provided in other manners. For example, optical sensors may be used to determine the extent of rotational or linear movement of one or more of the barrels 52, 54, 56, 58 or cylinders 22, 24, 26 or 28. In this case, the motor or other actuator may be driven until the optical sensor indicates that the barrel or cylinder has moved the desired amount.

Although the present invention has been described with respect to certain preferred embodiments, it will be appreciated by those of skill in the art that other implementations and adaptations are possible. For example, while the embodiments disclosed herein have been directed to stator windings, the machine and method disclosed herein could also be used to twist other windings, such as rotor windings. As another example, although the current twisting device has been described with four barrels and four associated cylinders, fewer or more barrels or cylinders may be utilized, depending on the number of conductor layers to be twisted. Moreover, there are advantages to individual advancements described herein that may be obtained without incorporating other aspects described above. Therefore, the spirit and scope of any claims should not be limited to the description of the preferred embodiments contained herein.

The invention claimed is:

1. An apparatus configured to bend conductors positioned in an electric machine component in a first layer and a second layer, the apparatus comprising:
a first conductor coupler including a first end and a second end, wherein the first end of the first conductor coupler is designed and dimensioned to engage the first layer of conductors in the electric machine component;
a second conductor coupler coaxially positioned within the first conductor coupler, the second conductor coupler configured to rotate independent of the first conductor coupler, the second conductor coupler including a first end and a second end, wherein the first end of the second conductor coupler is designed and dimensioned to engage the second layer of conductors in the electric machine component;
a first drive member operably connected to the first conductor coupler, the first drive member including a first servomotor operably coupled to a first pivoting arm, the first drive member configured to rotate the first conductor coupler in order to bend the first layer of conductors and simultaneously move the conductor coupler in an axial direction relative to the electric machine component; and
a second drive member including a second servomotor operably coupled to a second pivoting arm, the second drive member operably connected to the second conductor coupler, the second drive member configured to rotate the second conductor coupler in order to bend the second layer of conductors and simultaneously move the conductor coupler in an axial direction relative to the electric machine component, wherein the first drive member is configured to rotate and move in the axial direction independent of the second drive member.

2. The apparatus of claim 1 wherein the second end of the first conductor coupler includes a toothed rim configured to engage a toothed rim on the first drive member, and wherein the second end of the second conductor coupler includes a toothed rim configured to engage a toothed rim on the second drive member.

3. An apparatus configured to bend conductors positioned in an electric machine component, the apparatus comprising:
   a seat configured to receive the electric machine component;
   a first conductor coupler configured to engage a first plurality of the conductors positioned in the electric machine component, wherein the first conductor coupler comprises a first cylinder, the first cylinder including a plurality of slots positioned about a rim of the first cylinder, the plurality of slots configured to engage the first plurality of the conductors positioned in the electric machine component;
   a second conductor coupler configured to engage a second plurality of the conductors positioned in the electric machine component;
   a first servomotor configured to drive the first conductor coupler in a first rotational direction and a second rotational direction opposite the first rotational direction;
   a second servomotor configured to drive the second conductor coupler in the first rotational direction and the second rotational direction opposite the first rotational direction; and
   a barrel with a plurality of teeth engaging the first conductor coupler, the barrel operably connected between the first servomotor and the first conductor coupler, wherein the first servomotor is operably connected to a pivoting arm connected between the first servomotor and the barrel, wherein operation of the first servomotor causes the arm to pivot and rotate the barrel.

4. The apparatus of claim 3 further comprising a third servomotor configured to drive the first conductor coupler in an axial direction toward the seat when the first servomotor drives the first conductor coupler in the first rotational direction.

5. The apparatus of claim 4 further comprising a fourth servomotor configured to drive the second conductor coupler in an axial direction toward the seat when the second servomotor drives the second conductor coupler in the second rotational direction, wherein the fourth servomotor operates independent of the third servomotor.

6. The apparatus of claim 3 wherein the first conductor coupler comprises a first cylinder, the first cylinder including a plurality of slots positioned about a rim of the first cylinder, the plurality of slots configured to engage the first plurality of the conductors positioned in the electric machine component.

7. The apparatus of claim 3 wherein the barrel is also operably connected to a third servomotor such that operation of the third servomotor causes the barrel to move in an axial direction and move the first conductor coupler in the axial direction.

* * * * *